(12) United States Patent
Marinier et al.

(10) Patent No.: US 8,411,636 B2
(45) Date of Patent: *Apr. 2, 2013

(54) METHOD AND SYSTEM FOR AUTONOMOUS CHANNEL COORDINATION FOR A WIRELESS DISTRIBUTION SYSTEM

(75) Inventors: Paul Marinier, Brossard (CA); Marian Rudolf, Montreal (CA); Maged M. Zaki, San Diego, CA (US); Vincent Roy, Longueuil (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/485,429

(22) Filed: May 31, 2012

(65) Prior Publication Data

US 2012/0236749 A1 Sep. 20, 2012

Related U.S. Application Data

(63) Continuation of application No. 11/554,786, filed on Oct. 31, 2006, now Pat. No. 8,194,599.

(60) Provisional application No. 60/732,779, filed on Nov. 2, 2005.

(51) Int. Cl.
*H04W 4/00* (2009.01)

(52) U.S. Cl. ..................................... 370/329; 455/411

(58) Field of Classification Search .................. 455/453, 455/450, 452.1, 422.1, 41.2; 370/329, 338, 370/315, 310, 406, 238, 389; 709/228; 711/171
See application file for complete search history.

(56) References Cited

U.S. PATENT DOCUMENTS

| 5,875,179 | A | 2/1999 | Tikalsky |
| 6,501,745 | B1 | 12/2002 | Turina et al. |
| 2002/0060995 | A1 | 5/2002 | Cervello et al. |
| 2003/0189901 | A1 | 10/2003 | Ozugur et al. |
| 2004/0103282 | A1* | 5/2004 | Meier et al. ................... 713/171 |
| 2004/0156353 | A1 | 8/2004 | Bevan et al. |

(Continued)

FOREIGN PATENT DOCUMENTS

| EP | 1 727 312 | 11/2006 |
| RU | 99115640 | 7/2001 |

(Continued)

OTHER PUBLICATIONS

IEEE LAN/ MAN Standards Committee, ANSI/IEEE Std. 802.11, 1999 Edition (R2003), Information Technology —Telecommunications and Information Exchange Between Systems—Local and Metropolitan Area Networks—Specific Requirements, Part 11: Wireless Lan Medium Access Control (MAC) and Physical Layer (PHY) Specifications, (Reaffirmed Jun. 12, 2003).

(Continued)

*Primary Examiner* — Mahendra Patel
(74) *Attorney, Agent, or Firm* — Volpe and Koenig, P.C.

(57) ABSTRACT

A method and system for autonomous channel coordination for a wireless distribution system (WDS) are disclosed. A wireless communication system includes a plurality of access points (APs) and the APs communicate each other via a WDS. A coordinated channel group (CCG) of a plurality of member APs is established. The member APs of the CCG camp on a WDS channel used for the WDS among the member APs of the CCG. One AP among the member APs of the CCG is designated as a master AP. The master AP coordinates with other member APs of the CCG for selecting and configuring the WDS channel for the CCG and addition and deletion of member APs. By allowing APs to define a CCG, changes of the WDS channel are performed autonomously while maintaining connectivity.

16 Claims, 3 Drawing Sheets

U.S. PATENT DOCUMENTS

| | | | |
|---|---|---|---|
| 2004/0166837 A1 | 8/2004 | Backes | |
| 2004/0264394 A1 | 12/2004 | Ginzburg et al. | |
| 2005/0036475 A1 | 2/2005 | Nishiyama et al. | |
| 2005/0047383 A1 | 3/2005 | Yoshida | |
| 2005/0078624 A1* | 4/2005 | Shu et al. | 370/328 |
| 2005/0141498 A1* | 6/2005 | Cam Winget et al. | 370/389 |
| 2005/0201342 A1* | 9/2005 | Wilkinson et al. | 370/338 |
| 2005/0207381 A1* | 9/2005 | Aljadeff et al. | 370/338 |
| 2005/0254471 A1 | 11/2005 | Zhang et al. | |
| 2005/0256925 A1 | 11/2005 | Luo et al. | |
| 2006/0013159 A2 | 1/2006 | Gurevich | |
| 2006/0056331 A1 | 3/2006 | Ratiu et al. | |
| 2006/0098592 A1 | 5/2006 | Proctor Jr. et al. | |
| 2006/0114839 A1 | 6/2006 | Meier et al. | |
| 2006/0245373 A1 | 11/2006 | Bajic | |
| 2006/0262733 A1* | 11/2006 | Guo et al. | 370/254 |
| 2007/0030823 A1 | 2/2007 | Guo et al. | |
| 2007/0109989 A1 | 5/2007 | Nakagawa et al. | |
| 2007/0115901 A1 | 5/2007 | Lin | |
| 2007/0118748 A1 | 5/2007 | Edney | |
| 2007/0189249 A1 | 8/2007 | Gurevich et al. | |
| 2008/0045180 A1* | 2/2008 | Yang et al. | 455/411 |

FOREIGN PATENT DOCUMENTS

| | | |
|---|---|---|
| WO | 98/19400 | 5/1998 |
| WO | 2005/086420 | 9/2005 |

OTHER PUBLICATIONS

IEEE, IEEE P802.11v™/D1.05, Draft Amendment to Standard for Information Technology—Telecommunications and Information Exchange Between Systems—LAN/MAN Specific Requirements—Part Wireless Medium Access Control (MAC) and Physical Layer (PHY) Specifications, Amendment v: Wireless Network Management, (Sep. 2006).

Agre et al., Secure NOmadic Wireless Mesh (SnowMesh) 802.11 TGs ESS Mesh Networking Proposal, IEEE 802.11-05/596r1, Retrieved from http://www.flacp.fujitsulabs.com/snowmesh.pdf on Aug. 9, 2007, (May 15, 2005).

Cervelló et al., Dynamic Channel Selection (DCS) Scheme for 802.11, IEEE 802.11-00/195, (Jul. 12, 2000).

IEEE LAN/ MAN Standards Committee, ANSI/IEEE Std. 802.11, 1999 Edition (R2003), Information Exchange Between Systems—Local and Metropolitan Area Networks—Specific Requirements, Part 11: Wireless Lan Medium Access Control (MAC) and Physical Layer (PHY) Specifications, (Reaffirmed Jun. 12, 2003).

IEEE, IEEE P802.11v™/D0.05, Draft Amendment to Standard for Information Technology—Telecommunications and Information Exchange Between Systems—LAN/MAN Specific Requirements—Part Wireless Medium Access Control (MAC) and Physical Layer (PHY) Specifications, Amendment v: Wireless Network Management (Sep. 2006).

Sheu et al., IEEE P802.11 Wireless LANS: 802.11 TGs MAC Enhancement Proposal, IEEE 802.11-05/0575r3 (Sep. 2005).

* cited by examiner

METHOD AND SYSTEM FOR AUTONOMOUS CHANNEL COORDINATION FOR A WIRELESS DISTRIBUTION SYSTEM

CROSS REFERENCE TO RELATED APPLICATION

This application is a continuation of U.S. patent application Ser. No. 11/554,786 filed on Oct. 31, 2006, which issued as U.S. Pat. No. 8,194,599 on Jun. 5, 2012, which claims the benefit of U.S. Provisional Application No. 60/732,779 filed Nov. 2, 2005, which is incorporated by reference as if fully set forth.

FIELD OF INVENTION

The present invention is related to wireless communication systems. More particularly, the present invention is related to a method and system for autonomous channel coordination for a wireless distribution system (WDS).

BACKGROUND

In a WLAN system such as 802.11, stations (STAs) within a basic service set (BSS) share the same frequency channel to communicate with each other. In an infrastructure-mode BSS, an access point (AP) relays traffic to and from a distribution system (DS). Many BSSs can be connected to the DS through their APs. Communication between APs and other nodes within a DS can be supported by any medium access control (MAC) scheme, such as IEEE 802.3 in the case where a wired infrastructure exists. If a wired infrastructure does not exist, communication between APs can also take place wirelessly. A set of APs communicating wirelessly constitutes a WDS.

For successful communication between two APs in a WDS, the sending AP must transmit a packet on the channel used by the receiving AP. Generally, APs may choose the channel, (i.e., WDS channel), from a plurality of available channels to communicate with other APs. Typically, the WDS channel is same as the BSS channel used by an AP to transmit and receive packets to and from STAs in its own BSS. In the prior art, the WDS channel is configured manually by a system administrator and the APs are not capable of dynamically changing the WDS channel autonomously.

However, the manual configuration and setup is cumbersome, error-prone and costly. In addition, the most suitable WDS channel for communication within the WDS changes dynamically on a short-term basis due to changes in interference and traffic conditions. It is not realistic to manually keep track of these changes and change the WDS channel.

Therefore, it would be desirable to provide a method and system for autonomously configuring the WDS channel while maintaining connectivity within the WDS.

SUMMARY

The present invention is related to a method and system for autonomous channel coordination for a WDS. A wireless communication system includes a plurality of APs and the APs communicate each other via a WDS. A coordinated channel group (CCG) comprising a plurality of member APs is established. The member APs of the CCG camp on a WDS channel used for the WDS among the member APs of the CCG. One AP among the member APs of the CCG is designated as a master AP. The master AP coordinates with other member APs of the CCG for selecting and configuring the WDS channel for the CCG and addition and deletion of member APs. By allowing APs to define a CCG, changes of the WDS channel are performed autonomously while maintaining connectivity within the WDS.

DETAILED DESCRIPTION OF THE PREFERRED EMBODIMENTS

Hereafter, the terminology "STA" includes but is not limited to a wireless transmit/receive unit (WTRU), a user equipment (UE), a fixed or mobile subscriber unit, a pager, or any other type of device capable of operating in a wireless environment. When referred to hereafter, the terminology "AP" includes but is not limited to a base station, a Node-B, a site controller or any other type of interfacing device in a wireless environment.

The features of the present invention may be incorporated into an integrated circuit (IC) or be configured in a circuit comprising a multitude of interconnecting components.

Figure 1:
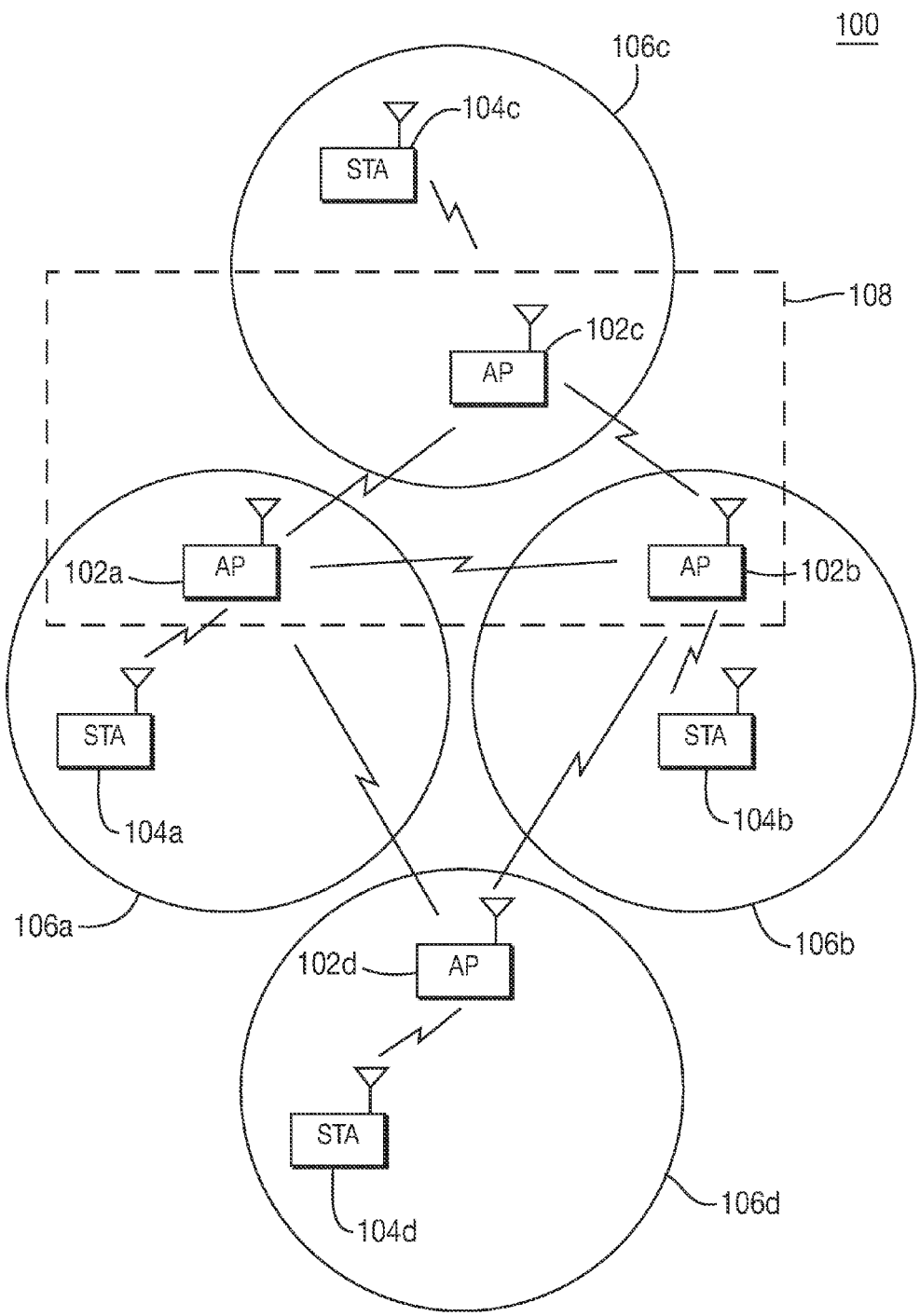
FIG. 1 shows an exemplary wireless communication system with a WDS in which the present invention is implemented.

FIG. 1 shows an exemplary wireless communication system 100 with a WDS in which the present invention is implemented. The system 100 includes a plurality of APs 102a-102d. Each of the APs 102a-102d serves its own BSS 106a-106d, (or independent BSS, hereinafter collectively "BSS"), respectively. The APs 102a-102d are capable of sending WDS traffic via a WDS established among the APs 102a-102d. The WDS traffic may be a packet sent from an AP in one BSS to an AP in another BSS, or a packet sent from a STA in one BSS to a STA in another BSS. The APs 102a-102d camp on a WDS channel used for the WDS traffic so that the APs 102a-102d transmit and receive WDS traffic on the common WDS channel.

The APs 102a-102d may be equipped with a single radio transceiver, (i.e., the APs need to share their radio transceiver for both their own BSS traffic and WDS traffic), or more than one radio transceiver. The WDS channel that the APs 102a-102d camp on may be different from the channel used to serve STAs 104a-104d in their own BSS 106a-106d, (i.e., BSS channel). If the WDS channel is different from the BSS channel, the AP 102a-102d should be able to simultaneously receive packets on more than one channel. An AP 102a-102d may be able to camp on more than one WDS channel.

In accordance with the present invention, at least one coordinated channel group (CCG) comprising a plurality of member APs is established. For example, in FIG. 1, APs 102a-102c belong to a CCG 108 and a common WDS channel is used for the WDS traffic in the CCG 108. In accordance with the present invention, the WDS channel may be dynamically changed and configured by coordinating APs 102a-102c in the CCG 108. By being part of the CCG 108, the APs 102a-102c are ensured of maintaining connectivity with all other APs 102a-102c that belong to the CCG 108. Furthermore, the APs 102a-102c may be ensured of maintain connectivity with APs, (such as AP 102d), belonging to other CCGs if certain rules are followed in the assignment of CCGs to APs.

Certain APs may or may not have the capability of transmitting packets to other APs of the WDS on a frequency channel different from the one they are camping on. In order to maintain connectivity with other APs of the WDS, an AP not equipped with this capability should never create a new CCG unless it is the only AP being active in the environment. Similarly, the selection of the master of a CCG could be performed manually through operation, administration and maintenance (OAM). If this approach is selected, the APs not selected as CCG master in the OAM configuration should be precluded from attempting to create a new CCG (in which case they would automatically become master of the newly created CCG). An AP may be part of as many CCGs as the number of channels on which it is capable of camping.

One of the APs 102a-102c of the CCG 108 is designated as a master AP, (e.g., AP 102a). The master AP may be designated autonomously or by manually through OAM. The master AP 102a accepts or rejects requests from other non-member APs, (such as AP 102d), to be a part of the CCG 108, collects relevant information from the member APs 102b, 102c within the CCG 108 to make a WDS channel change decision, (including requests from member APs 102b, 102c to perform a channel change), executes a WDS channel change, and executes changes of other parameters, (such as transmission power, a clear channel assessment (CCA) mode (or the like), admission control parameters or other relevant operational settings), that may affect the performance of the system. CCA is a function that determines if the medium is busy in IEEE 802.11. The CCA mode (or something similar in other types of systems) defines how this determination is made exactly, (e.g., compare to a threshold or not, nature of the signal, or the like).

An AP 102a-102c that is part of the CCG 108 for a given WDS channel periodically broadcasts, multicasts or unicasts a CCG indicator (CCGI) on the WDS channel. The CCGI is a unique identifier, (e.g., label, code, alpha-numeric designation, number, or the like). The CCGI may be included in an existing frame, (such as a beacon frame or a probe response frame), or a stand-alone (management) frame dedicated to the CCG functionality. The master AP 102a sets a master indicator, (e.g., a flag, a bit field or an identification string), associated to the CCGI to indicate that the AP 102a is the master of the CCG 108. Only the master AP 102a sets the master indicator.

Figure 2:
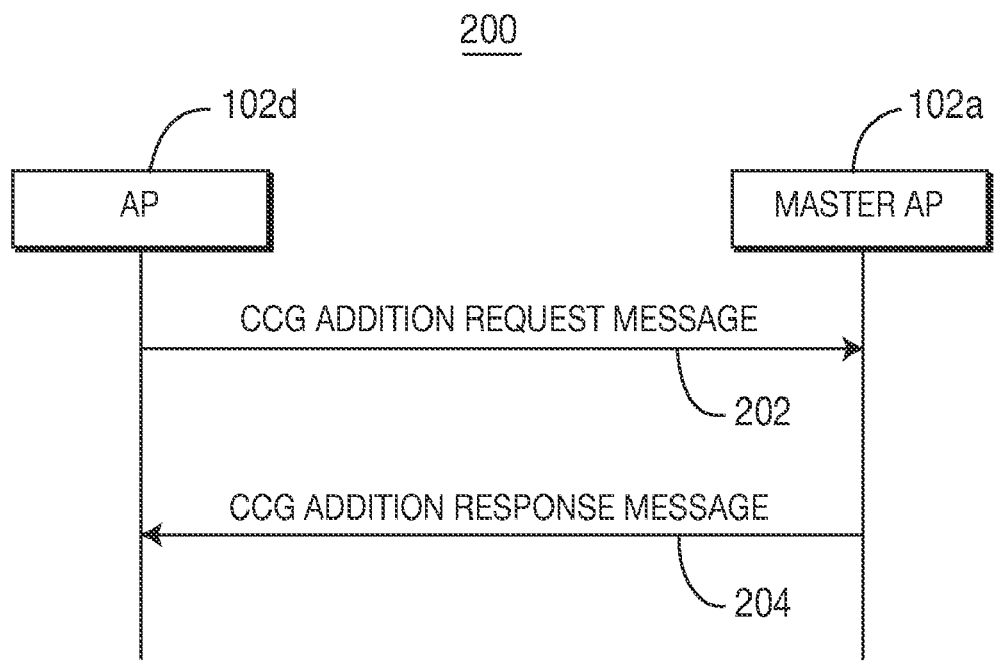
FIG. 2 is a signaling diagram of a process for exchanging messages for joining a CCG between an AP and a master AP in accordance with the present invention.

FIG. 2 is a signaling diagram of a process 200 for exchanging messages for joining a CCG between a non-member AP and a master AP in accordance with the present invention. A non-member AP, (such as AP 102d), desiring to join an existing CCG 108 sends a CCG addition request message to the master AP 102a along with capability information of the AP 102d and/or BSS information (step 202). The CCG addition request message includes the CCGI of the requested CCG 108.

The capability information includes, but is not limited to, the list of frequency channels on which the AP 102d is capable of camping and information as to whether the AP 102d is capable of reporting channel utilization or interference measurement. The BSS information is information related to the BSS served by the AP 102d, (e.g., whether or not the AP 102d is using the common channel to serve its own BSS, and, if yes, how many STAs are currently served by the AP 102d).

The master AP 102a determines whether the non-member AP 102d should be accepted or not and responds to the non-member AP 102d with a CCG addition response message, which indicates a positive or negative response (step 204). If the non-member AP 102d receives a positive response, the AP 102d becomes a part of the CCG 108 and starts broadcasting the CCGI.

The criteria in determining whether the non-member AP 102d should be accepted in the CCG 108 include, but are not limited to, insufficient capabilities, (e.g., not being able to receive on certain channels), and the number of APs included in the CCG 108, (since if too many APs are included in the CCG 108, it may result in poor performance or unacceptable delays in changing the WDS channel of the CCG 108), or any other relevant factors. The master AP 102a may measure some factors by itself and those factors need not be directly communicated by the non-member AP 102d. For example, the master AP 102a may measure channel loading, interference, path loss between the non-member AP 102d and the master AP 102a or received signal strength from the non-member AP 102d, or the like.

The CCG addition request message may be included in any conventional frame, (e.g., a probe request message or an association request message), or may be included in a new stand-alone (management) frame. The CCG addition response message may also be included in any conventional frame, (e.g., a probe response frame or an association response frame), or may be included in a new stand-alone (management) frame.

Figure 3:
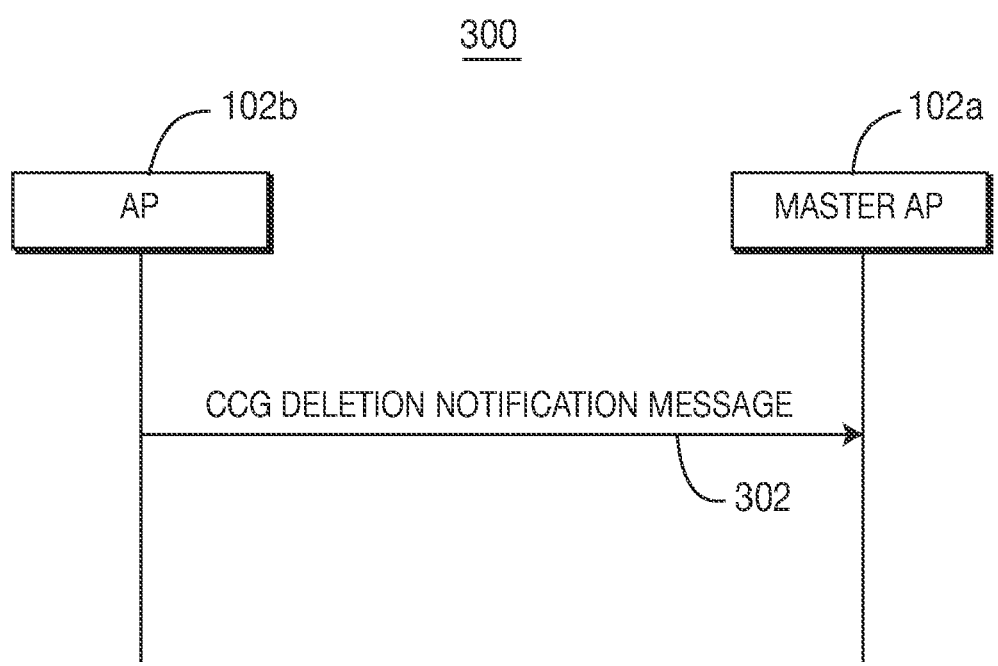
FIG. 3 is a signaling diagram of a process for exchanging messages for leaving a CCG between an AP and a master AP in accordance with the present invention.

FIG. 3 is a signaling diagram of a process 300 for exchanging messages for leaving a CCG between an AP and a master AP in accordance with the present invention. A member AP, (such as AP 102b), desiring to leave the CCG 108 sends a CCG deletion notification message to the master AP 102a (step 302). Upon receipt of the CCG deletion notification message, the AP 102b no longer belongs to the CCG 108. The CCG deletion notification message may be included in any conventional frame, (e.g., a disassociation message), or may be included in a new stand-alone (management) frame.

The member APs 102b, 102c of the CCG 108 preferably report measurements to the master AP 102a of the CCG 108. The measurements to be reported include not only measurements performed by the APs 102b, 102c, but also any measurements reported by STAs 104b, 104c served by their own BSSs 106b, 106c if the WDS channel is same to the BSS channel used within their own BSS 106b, 106c. Relevant measurements that may be reported by each member AP 102b, 102c in support of channel management within the CCG 108 include, but are not limited to, interference levels measured on each channel, channel utilization of each channel, the number of STAs detected on each channel, and addresses or identifiers of STAs 104b, 104c currently associated with the APs 102b, 102c. If the BSS channel of the AP 102b, 102c is same as the WDS channel, a member AP 102b, 102c may notify the master AP 102a of any relevant configuration modification, (such as the association or disassociation of a STA 104b, 104c served by the AP 102b, 102c).

Figure 4:
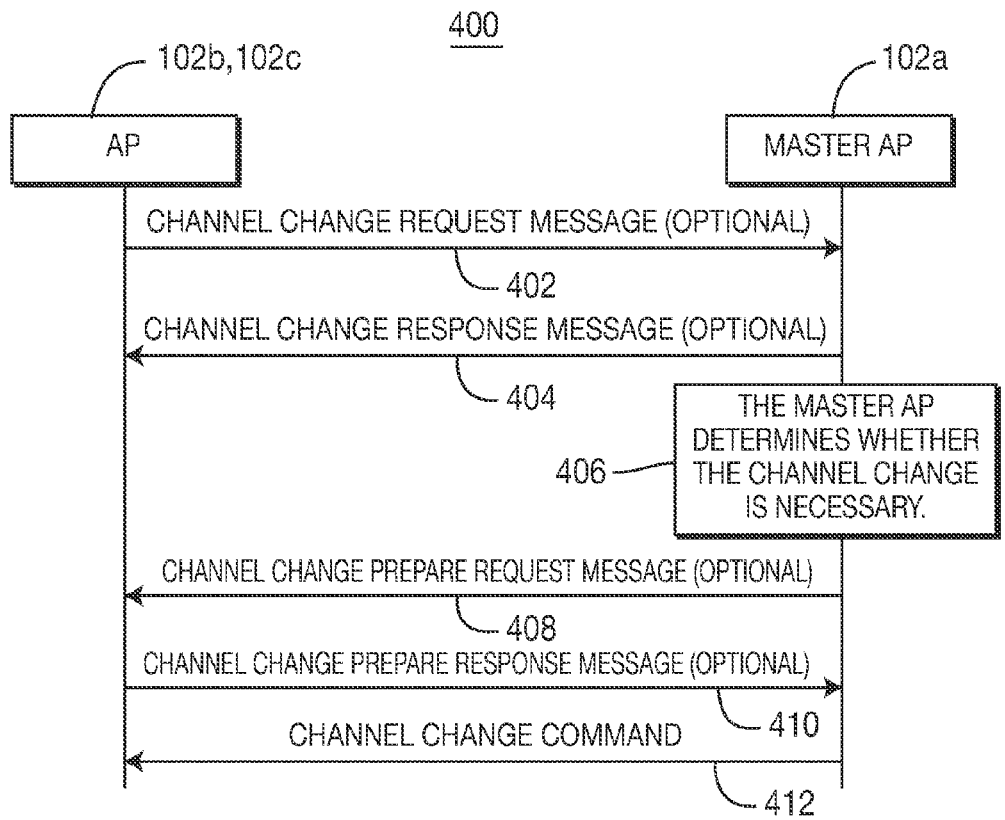
FIG. 4 is a signaling diagram of a process for exchanging messages for channel change between an AP and a master AP in accordance with the present invention.

FIG. 4 is a signaling diagram of a process 400 for exchanging messages for change of the WDS channel between a member AP 102b, 102c and a master AP 102a in accordance with the present invention. A member AP 102b, 102c experiencing severe interference conditions on the currently selected WDS channel may send a channel change request message to the master AP 102a for a change of the WDS channel (step 402). The channel change request message may include an order of preference for a new channel, as well as any measurement information relevant for selecting a new WDS channel.

Upon receipt of the channel change request message, the master AP 102a may optionally respond the requesting AP 102b, 102c with a channel change response message indicating an accept or a reject of the request (step 404). The master AP 102a then determines whether a change of the WDS channel is necessary (step 406). Alternatively, the channel change may be initiated by the master AP 102a without receiving the channel change request message. If the master AP 102a determines that the change of the WDS channel is necessary, the master AP 102a sends all member APs 102b, 102c of the CCG 108 a channel change command to change the WDS channel to a new channel (step 412).

The channel change command includes timing information on which the channel change is executed. With respect to the timing of the channel change, for those member APs that use the same channel for the WDS traffic and BSS traffic on their BSSs, the master AP 102a may consider additional time so that these APs notify the STAs of their BSSs of the channel change. The master AP 102a may determine the additional time based on the number of STAs associated with these APs.

Alternatively, the master AP 102a may send, (i.e., broadcast, multicast or unicast), a channel change prepare request message to all member APs 102b, 102c to inform the member APs 102b, 102c of the new WDS channel to which the master AP 102a intends to switch (step 408). Each member AP 102b, 102c then responds with a channel change prepare response message indicating the delay necessary for them to notify their STAs 104b, 104c of the channel change (step 410). Based on the responses from the member APs 102b, 102c, the master AP 102a determines the time at which the channel change will take place, (presumably using the highest delay reported by one of the member APs 102b, 102c), and signals this time with the channel change command at step 410.

An AP may create a new CCG. The AP that wants to create a new CCG selects a CCGI that is not used by any other CCG of the WDS. The AP first scans all frequency channels on which it is capable of receiving to detect all CCGIs in use in the WDS. To reduce the probability that the same CCGI is accidentally reused, the CCGI may be randomly selected within a predetermined range. After selection of the CCGI of the new CCG, the AP becomes the master of the newly created CCG and starts broadcasting the CCGI with the master indicator set.

Where two or more CCGs are setup, an AP may select a CCG to join an available CCGs. The selection of a CCG to which an AP attempts to join may be performed autonomously by an AP, or may be manually configured through an operation and maintenance (OAM). The manual selection would be desirable in case there is a small number of APs in the WDS and it is expected that based on traffic requirements and AP capabilities the best performance is achieved when the APs camp on the same WDS channel.

In selecting the CCG, an AP considers capabilities of the different APs. Certain APs may or may not have the capability of transmitting packets to other APs of the WDS on a channel other than the one on which they are camping. In order to maintain connectivity with other APs of the WDS, an AP not having with this capability should never create a new CCG unless it is the only AP that is active in the environment.

The master AP 102a may be manually or autonomously selected and reselected. If the master AP 102a is selected manually through OAM, the APs 102b, 102c not selected as a master AP 102a are precluded from creating a new CCG (in which case they would automatically become a master AP of the newly created CCG). In manual configuration, a centrally located AP may be selected as the master AP to ensure good connectivity with other APs.

By default, the AP that created the CCG becomes the master AP. A master AP reselection procedure may be triggered autonomously. For example, the master AP reselection procedure is triggered when the master AP is down, when the master AP desires leave the CCG, when the master AP has not transmitted anything for a predetermined period, when the master AP unsets its master indicator indicating that the master AP relinquishes mastership, or the like.

Figure 5:
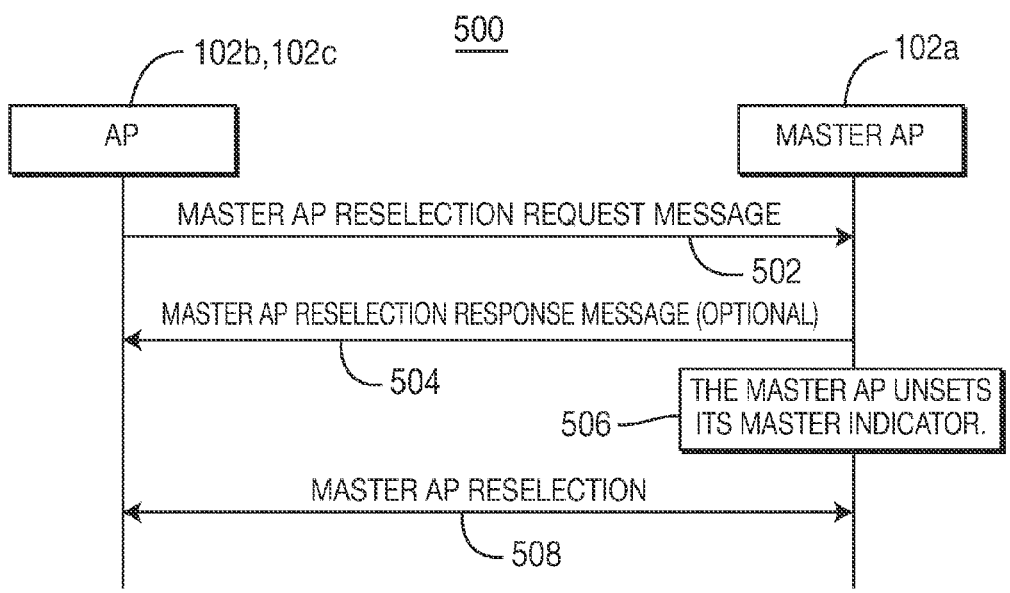
FIG. 5 is a signaling diagram of a process for exchanging messages for reselecting a master AP between an AP and a master AP in accordance with the present invention.

In addition, any member AP 102, 102c may trigger the master AP reselection procedure. FIG. 5 is a signaling diagram of a process 500 for exchanging messages for reselecting a new master AP between a member AP 102b, 102c and a current master AP 102a in accordance with the present invention. A member AP 102b, 102c sends a master AP reselection request message to the master AP 102a (step 502). Upon reception of the message, the master AP 102a may optionally send a master AP reselection response message to the requesting AP 102b, 102c (step 504). The master AP 102a then unsets its master indicator to indicate all other member APs 102b, 102c that a master AP reselection procedure is triggered (step 506). A master AP reselection is then performed by the member APs 102b, 102c and the master AP 102a (step 508).

A new master AP may be selected by any appropriate means. For example, the new master AP may be selected by exchanging metrics associated with each of the APs in the CCG. For example, the metrics may be traffic volume or simply random numbers. The AP with the highest metric may be selected as a new master AP.

A signaling between the APs and the master AP may be realized as part of non-IEEE 802.11 protocol. For example, a generic network management protocol, such as simple network management protocol (SNMP) or extended markup language (XML) may be used to control, report and update operational parameters and settings affecting an AP's choice of the WDS channel and CCG. The parameters and settings are stored in an AP database such as a management information base (MIB). Each AP may contain a software, hardware or combined routine that on a regular or triggered basis checks for updates of the parameters and settings contained in the AP's database and adjusts the behavior of the APs accordingly. Alternatively, the software, hardware or combined routine in the AP on a regular or triggered basis checks for updates of the parameters and settings in a remote database relevant for a group of APs or all APs.

An L2 Ethertype or L3 control protocol may also be used to communicate signaling, bit fields and/or information elements. An AP may contain a software, hardware or combined communication routine that interfaces between the external L2 Ethertype or L3 control protocol carried over the IEEE 802.11-based WDS or BSS. This adjusts operational settings of the AP directly after receiving such a L2 Ethertype or L3 control protocol message. Alternatively, it may indirectly adjust by means of one or more intermediary databases applicable to a single AP or a group of APs.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for establishing a coordinated group of access points (APs), the method comprising:
   an access point (AP) receiving a first beacon frame broadcast by a master AP of a group of member APs, the first beacon frame containing a first field and a second field, wherein the first field is set to a value identifying the group and the second field is set to a value indicating that a sender of the first beacon frame is a master AP of the group; and
   the AP sending a second beacon frame containing a third field and a fourth field, wherein the third field is set to the value identifying the group and the fourth field is set to a value indicating that a sender of the second beacon frame is not a master AP of the group.

2. The method of claim 1 further comprising:
   the AP sending capability information of the AP to the master AP.

3. The method of claim 2 wherein the capability information includes at least one of a list of frequency channels that the AP supports, information as to whether the AP is capable of reporting channel utilization and interference measurement, or information related to a basic service set (BSS) served by the AP.

4. The method of claim 1 further comprising:
   the AP sending measurements to the master AP.

5. The method of claim 4 wherein the measurements include at least one of interference level measured on each channel, channel utilization of each channel, number of stations (STAs) detected on each channel, or identities of STAs associated to the AP.

6. The method of claim 4 wherein the measurements include measurements reported by STAs associated to the AP.

7. The method of claim 1 further comprising:
   the AP receiving a channel change command from the master AP for changing a channel used among member APs of the group; and
   the AP switching a channel based on the channel change command.

8. The method of claim 7 wherein the channel change command includes timing information for execution of channel change.

9. An access point (AP) for establishing a coordinated group of APs, the apparatus comprising:
   a controller configured to receive a first beacon frame broadcast by a master AP of a group of member APs, the first beacon frame containing a first field and a second field, wherein the first field is set to a value identifying the group and the second field is set to a value indicating that a sender of the first beacon frame is a master AP of the group; and
   the controller further configured to send a second beacon frame containing a third field and a fourth field, wherein the third field is set to the value identifying the group and the fourth field is set to a value indicating that a sender of the second beacon frame is not a master AP of the group.

10. The AP of claim 9 wherein the controller is configured to send capability information of the AP to the master AP.

11. The AP of claim 10 wherein the capability information includes at least one of a list of frequency channels that the AP supports, information as to whether the AP is capable of reporting channel utilization and interference measurement, or information related to a basic service set (BSS) served by the AP.

12. The AP of claim 9 wherein the controller is configured to send measurements to the master AP.

13. The AP of claim 12 wherein the measurements include at least one of interference level measured on each channel, channel utilization of each channel, number of stations (STAs) detected on each channel, or identities of STAs associated to the AP.

14. The AP of claim 12 wherein the measurements include measurements reported by STAs associated to the AP.

15. The AP of claim 9 wherein the controller is configured to receive a channel change command from the master AP for changing a channel used among member APs of the group, and switch a channel based on the channel change command.

16. The AP of claim 15 wherein the channel change command includes timing information for execution of channel change.

* * * * *